United States Patent
Bedell (10) Patent No.: US 7,917,411 B1
(45) Date of Patent: Mar. 29, 2011

(54) SYSTEM AND METHOD FOR REDUCING RETURN ERRORS

(75) Inventor: David A. Bedell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 248 days.

(21) Appl. No.: 11/669,371

(22) Filed: Jan. 31, 2007

(51) Int. Cl.
 *G06F 17/22* (2006.01)
 *G06B 17/00* (2006.01)
(52) U.S. Cl. ............................................ 705/31; 705/30
(58) Field of Classification Search ............... 705/31
 See application file for complete search history.

(56) References Cited

U.S. PATENT DOCUMENTS

| | | | |
|---|---|---|---|
| 6,202,052 B1 * | 3/2001 | Miller | 705/31 |
| 6,401,079 B1 * | 6/2002 | Kahn et al. | 705/30 |
| 6,697,787 B1 * | 2/2004 | Miller | 705/31 |
| 6,823,478 B1 * | 11/2004 | Prologo et al. | 714/38 |
| 7,565,312 B1 * | 7/2009 | Shaw et al. | 705/31 |
| 2001/0037268 A1 * | 11/2001 | Miller | 705/31 |
| 2002/0013747 A1 * | 1/2002 | Valentine et al. | 705/31 |
| 2002/0091602 A1 * | 7/2002 | Stern et al. | 705/35 |
| 2002/0111888 A1 * | 8/2002 | Stanley et al. | 705/31 |
| 2004/0078271 A1 * | 4/2004 | Morano et al. | 705/19 |
| 2004/0083145 A1 * | 4/2004 | Kobayashi et al. | 705/31 |
| 2004/0088233 A1 * | 5/2004 | Brady et al. | 705/31 |
| 2005/0038722 A1 * | 2/2005 | Throndson et al. | 705/31 |
| 2005/0228729 A1 * | 10/2005 | Cook et al. | 705/30 |
| 2006/0085304 A1 * | 4/2006 | Buarque De Macedo et al. | 705/31 |
| 2006/0111990 A1 * | 5/2006 | Cohen et al. | 705/32 |
| 2006/0235776 A1 * | 10/2006 | Temme | 705/31 |
| 2006/0271451 A1 * | 11/2006 | Varughese | 705/31 |
| 2007/0033117 A1 * | 2/2007 | Murray | 705/31 |
| 2008/0071703 A1 * | 3/2008 | Evans | 705/36 T |

* cited by examiner

*Primary Examiner* — Matthew S Gart
*Assistant Examiner* — Ashford Hayles
(74) *Attorney, Agent, or Firm* — Osha • Liang LLP (57) ABSTRACT

A system and method for error reduction may reduce errors of tax returns filed with a taxing authority. The system and method for error reduction may include an error reduction component that may compare user-supplied tax information to corresponding tax entity information accessed from a taxing authority. The error reduction component may present the corresponding tax information to the user. If a discrepancy is detected by the error reduction component, the error reduction component may notify the user so that the discrepancy may be corrected before a tax return containing the discrepant information is filed with a taxing authority. The error reduction component may enable a user to correct discrepancies in user-supplied tax information and/or corresponding tax entity information possessed by a taxing authority. In various embodiments, the error reduction component may be implemented with a tax preparation application.

21 Claims, 10 Drawing Sheets

->You reported an annual income of $50,000.00 on your tax return.

->The records of the <taxing authority> indicate this amount is incorrect.

Display 500A

Would you like to resolve this discrepancy?

☐ Yes.
☐ No.

Cancel          <Back    Next>

*Figure 5a*

->The records of the <taxing authority> indicate that you received $51,000.00 in annual income.

->Would you like to see a summary of the <taxing authority's> records?

☐ Yes.
☐ No.

Display 500B

Cancel          <Back    Next>

*Figure 5b*

->The following is a summary of the relevant <taxing authority> records:    Display
                                                                           500C
Income Source 1: You earned $50,000.00 from Acme Brick, Inc.
Income Source 2: You earned $1,000.00 from Acme Investments, Inc.

Would you like to make a correction to your tax return?

❑  Yes.
❑  No.

Cancel            <Back    Next>

*Figure 5c*

->How would you like to correct your tax return?

❑  Enter income from an additional income source.
❑  Modify an existing income source entry.                Display
❑  Remove an existing income source entry.                500D Cancel            <Back    Next>

SYSTEM AND METHOD FOR REDUCING RETURN ERRORS

BACKGROUND

Before filing a tax return with a taxing authority, a tax entity (e.g., an individual, business, or organization subject to taxation) may receive tax information to be reported on the tax return. For example, the tax entity may receive a wage and tax statement from an employer or a statement of interest income from a financial institution (e.g., a bank, investment firm, or any other appropriate financial institution). One or more of the received forms may contain tax information, such as annual income earned and/or amount of taxes withheld, that may need to be reported on the tax return. A user, such as the tax entity or a tax preparer preparing a tax return on behalf of the tax entity, may utilize the tax information to complete a tax return (e.g. via a tax preparation application) and file it with a taxing authority (e.g., IRS, state authority, local authority, foreign authority). In addition to the information received from third parties, the user may also use other information of the tax entity such as an identification number (e.g., Social Security Number or Employer Identification Number), dependent information, tax deduction information, or any other information that might be useful for the completion of a tax return.

A taxing authority may receive tax entity information corresponding to a tax entity form one or more sources. For example, one or more third parties may send to the taxing authority tax information that pertains to a specific tax entity. Typically, the information that the taxing authority receives from third parties for a particular tax entity correlates to the information that the particular tax entity receives from the third parties. A taxing authority may require that the third parties that send tax information to tax entities also send corresponding tax information to the taxing authority. In addition to the information received from third parties, the taxing authority may also have (or have access to) additional records that pertain to specific tax entities. For example, the taxing authority may have access to a database of identification numbers (e.g., Social Security Numbers or Employer Identification Numbers) for specific tax entities.

The taxing authority may use the tax information received from third parties as well as additional records to verify information reported on a tax entity's tax return. When the taxing authority receives a tax return from the tax entity, the taxing authority may verify some of the information of the tax return with information received, for example, from the tax entity's employer(s). For instance, if the tax entity's tax return indicates the tax entity earned $50,000 for a specific time period and the employer(s) reports the tax entity earned $51,000 during that time period, the taxing authority may determine that a discrepancy exists between the information of the tax return and the information submitted by the tax entity's employer(s). This type of error may occur for various reasons. For example, the tax entity may have forgotten to report income from a secondary income source such as an interest earning bank account or part-time job. In other cases, the tax entity may not have received documents pertaining to income earned and thus failed to report the correct amount of income in the tax return.

Typically, when an error is detected by the taxing authority, the taxing authority may notify the tax entity that an error requiring correction has been detected. In some cases, the tax entity may be required to pay additional taxes to the taxing authority as a result of correcting the errors. It may be desirable to detect the error(s) before the tax entity submits the tax return to the taxing authority. Tax entities, tax preparers, and/or tax preparation applications (e.g., applications that create tax returns for tax entities based on tax information provided by the tax entities) may detect some types of errors within tax returns. However, many types of tax return errors, such as the errors and discrepancies described above, are not detected before filing the tax return with a taxing authority.

SUMMARY

A system and method for reducing return errors of returns filed with an authority is described. In some cases, the information that an entity reports on a return may be incorrect or inconsistent with corresponding entity information possessed by an authority. For example, if the entity were a taxable entity and the authority were a taxing authority, the information that the entity reports on a return might include information pertaining to income. The system and method for reducing return errors may include a software application (or other system) that includes an error reduction component that may reduce errors detected by an authority by, prior to filing a return with the authority, detecting differences or discrepancies between user-supplied entity information and corresponding entity information possessed by the authority. The user of the application may be an entity seeking to reduce errors associated with their own return or another entity (e.g., a tax preparer) seeking to reduce errors on the entity's behalf.

In one embodiment, the error reduction component may be part of a return preparation application such as an application configured to create a return from user-supplied information. The error reduction component may request and receive corresponding entity information (that corresponds to the user-supplied information) from an authority. The preparation application may compare the user-supplied information to the corresponding entity information received from the taxing authority and determine differences or inconsistencies between the information. The preparation application may enable the user to correct the errors and inconsistencies in order to reduce the number of errors when filing a tax return that includes user-supplied tax information.

While the system and method for reducing return errors is described herein by way of example for several embodiments and illustrative drawings, those skilled in the art will recognize that the system and method for reducing return errors is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the system and method for reducing return errors as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Although the descriptions provided herein are given in terms of tax entities, tax information, user-supplied tax information, tax returns, tax entity information, and taxing authorities, the system and methods described herein may apply to other entities, information, returns, and authorities. In general, a return may include any filing required by an authority, agency, or other organization. The descriptions provided herein may apply to returns required by other agencies (e.g., services, oversight or compliance organizations, authorities or other agencies, governmental or otherwise), such as electronically filing statements including, e.g., payroll data, financial statements or a Securities and Exchange Commission (SEC) returns (e.g., form 10-K or 10-Q).

A system and method for error reduction may reduce errors of returns (e.g., tax returns) filed with an authority (e.g., a taxing authority). In various embodiments, an error reduction component of an application (or other system) may reduce or reduce errors of a filed return. The error reduction component may receive information supplied by a user (e.g., a tax entity or an entity acting on behalf of the tax entity). For example, the error reduction component may receive from the user a return or other information that is typically reported on a return (e.g., earnings information, dependent information, and identification numbers). Additionally, the error reduction component may request and receive corresponding tax entity information for the specific tax entity from a taxing authority. In many cases, the corresponding tax entity information may be information that the taxing authority has received from one or more information providers such as employers, banks, financial institutions, or any other appropriate information provider, whether required by law, or not. For example, an employer may report an employee's earnings information to the taxing authority.

The error reduction component may compare the user-supplied information to the corresponding entity information received from the authority in order to determine if one or more differences (or discrepancies) exist between the information and thereafter notify the user of the difference before a return including the user-supplied information is filed with an authority. In this way, any errors may be detected before a return including the user-supplied information is filed with an authority thereby reducing errors detected by the authority when the return is filed with the authority. For example, in various embodiments, the error reduction component may be implemented within a tax preparation application (e.g., an application that creates a tax return from tax information supplied by a user). In some embodiments, the error reduction component may enable a user to correct differences between user-supplied information and corresponding entity information (e.g., tax entity information) received from an authority (e.g., a taxing authority).

Figure 1A:
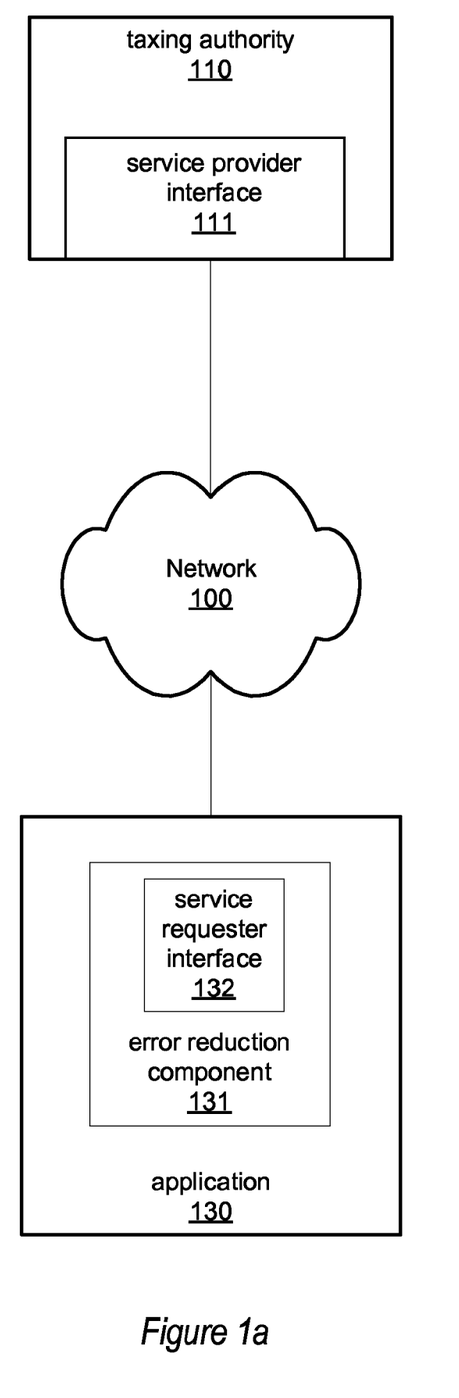
FIG. 1a is a block diagram illustrating one embodiment of a system for reducing return errors, as described herein.

FIG. 1a illustrates a block diagram of a system for reducing return errors according to one embodiment. The system may include an application, such as application 130, coupled to taxing authority 110 via network 100. Network 100 may represent the Internet, and items coupled to network 100 may be configured to communicate with other items over the Internet. In some embodiments, network 100 may represent a wide area network (WAN), or a local area network (LAN) such as an Ethernet network. In other embodiments network 100 may represent a combination of WANs, LANs, or the Internet.

Application 130 may be any application that includes an error reduction component, such as error reduction component 131. In some embodiments, application 130 may be a tax preparation application such as an application configured to create a tax return from tax information provided to the tax preparation application. For example, application 130 may present a series of displays (e.g., through a computer monitor) that prompt the user for tax information and create a tax return from tax information that the user supplies. Additionally, application 130 may run on a variety of devices capable of running an application. In one embodiment, application 130 may run on a computer system such as a desktop computer or notebook computer. In some embodiments, application 130 may run on a remote server such as an application server or web server. For example, application 130 may be a web-based application running on an application server and configured to be accessed from a web browser of another computer (e.g., a client computer). In other embodiments, application 130 may run on a portable device such as a personal digital assistant (PDA), PDA phone, smart-phone, or mobile phone.

Application 130 may include an error reduction component, such as error reduction component 131, that may reduce errors of tax returns filed with a taxing authority. The error reduction component may reduce or reduce errors of tax returns filed with a taxing authority by providing a user (e.g., a tax entity or entity acting on behalf of the tax entity) with tax entity information that a taxing authority has on record for a specific entity (or entities) for a particular return filing period. Since errors (e.g., such as matching errors) may occur when a user files (with a taxing authority) a tax return that contains information that is inconsistent with corresponding tax entity information that the taxing authority has on record for the tax entity that the tax return is associated with, receiving the corresponding tax entity information from the taxing authority before the tax return is filed may reduce tax return errors when filing a tax return with the taxing authority for a particular return filing period. In other words, if a user receives the corresponding tax entity information before filing the tax return with the taxing authority, the information within the tax return may be corrected to be consistent (or more consistent) with the corresponding tax entity information before the tax return is filed with the taxing authority. For example, if the tax information included within the user's tax return indicates that the tax entity earned $50,000 during a specific time period and the corresponding tax entity information indicates that the tax entity earned $51,000 during the specific time period, the discrepancy may be corrected before filing the tax return. For instance, the user may correct the earned amount to be consistent with the corresponding tax entity information before filing the tax return. Alternatively, such as in the case that the user believes the corresponding tax entity information to be incorrect, the user may contact the taxing authority to resolve the discrepancy before filing the tax return.

In order to provide the user with the corresponding tax entity information, the error reduction component 131 may access tax entity information from a taxing authority, such as taxing authority 110. Tax entity information may include information that a taxing authority has on record for specific tax entities. For example, the records of a taxing authority may include tax related information associated with specific tax entities such as information pertaining to earnings, investments, estates, dependents, tax deductions, and other tax related items. In some cases, the information included in the records of the taxing authority may have been supplied to the taxing authority by third parties such as the information providers described above (e.g., employers, financial institutions, partnerships, trusts, and other organizations that a tax entity is associated with). In some cases, the information included in the records of the taxing authority for a specific tax entity corresponds to information that the specific tax entity has received from information providers. For example, an employer may send a form containing wage information (e.g., an IRS Form W-2) to a tax entity. The employer may also send a corresponding form (e.g., IRS Form W-2 or another document containing similar information) to the taxing authority. Additionally, the taxing authority may have (or have access to) information other than tax information sent from information providers. For example, the taxing authority may have records that correlate specific identification numbers (e.g., Social Security Numbers or Employer Identification Numbers) to specific tax entities.

To access the tax entity information from a taxing authority, such as taxing authority 110, error reduction component 131 may send a request for tax entity information that corresponds to a specific tax entity (or entities) over a network (e.g., network 100). For example, the error reduction component may include an identification number of a tax entity (e.g., a Social Security Number or Employer Identification number) within the request. The taxing authority may service the request by transmitting the tax entity information to error reduction component over a network, such as network 100. In various embodiments, the taxing authority may provide a web service (or API) such that the taxing authority may service requests sent to service provider interface 111. Additionally, the error reduction component may send requests for tax entity information to service provider interface 111 from service requester interface 132. For example, the request for tax entity information may be sent to the service provider interface 111 as a Remote Procedure Call (RPC) over Simple Object Access Protocol (SOAP) or a Representation State Transfer (REST) web service request.

In various embodiments, the user of an application that includes error reduction component 131 may provide the error reduction component with tax information. In other words, error reduction component 131 may receive tax information from a user of the application, such as a tax entity (e.g., an individual or business) or an entity acting on behalf of the tax entity (e.g., a tax preparer). The tax information that error reduction component 131 may receive from a user may include information from tax documents sent to a tax entity from information providers such as employers, financial institutions, partnerships, trusts, and other organizations that the tax entity is associated with. For example, a tax document may include a document containing earnings information (e.g., IRS Form W-2) sent to an employee (the tax entity) from an employer (the information provider). In further example, a tax document may include a document containing interest income (e.g., IRS Form 1099-INT) sent to a client (the tax entity) from a financial institution (the information provider). Error reduction component 131 may also include information that is not necessarily provided by information providers. For example, error reduction component may receive personal information from a user such as tax entity contact information (e.g., addresses and phone numbers).

In various embodiments, error reduction component 132 may compare tax information received from a user (e.g., a tax entity or an entity acting on behalf of the tax entity) to corresponding tax entity information received from a taxing authority (e.g., taxing authority 110) in order to determine any differences or discrepancies between the user-supplied tax information and corresponding tax entity information. The user-supplied tax information may include a tax return, portions of a tax return, or tax information typically included within a tax return. For example, a portion of the user-supplied tax return information and corresponding tax entity information may be associated with a tax entity's earnings for a specific time period. Error reduction component 132 may compare the earnings information of the user-supplied tax information to the earnings information of the corresponding tax entity information. If the two portions of information differ, error reduction component 132 may detect such a difference and notify the user (e.g., through a display or other user-interface) of the difference before a tax return containing the user-supplied tax information is filed with a taxing authority.

In some embodiments, error reduction component 132 may enable a user to correct differences or discrepancies between user-supplied tax information and corresponding tax entity information received from a taxing authority. In various embodiments, the error reduction component may enable the user to modify the user-supplied tax information in order to make the user-supplied tax information consistent with the corresponding tax entity information. In one embodiment, the error reduction component may be part of a tax preparation application and the user-supplied tax information may include information that the user-supplied the tax preparation application. In this case, the error reduction component enabling the user to modify the user-supplied tax information may include presenting to the user one or more displays (or other user-interface) in which the user may submit a modification to the user-supplied tax information. The error reduction component may incorporate the modification into the user-supplied tax information. In various embodiments, the error reduction component may enable the user to modify the corresponding tax entity information. For example, in one embodiment, the error reduction component may present to the user one or more displays in which the user may submit a modification to the tax entity information. After receiving the modification, the error reduction component may transmit the modification to the taxing authority over a network, such as network 100.

Figure 1B:
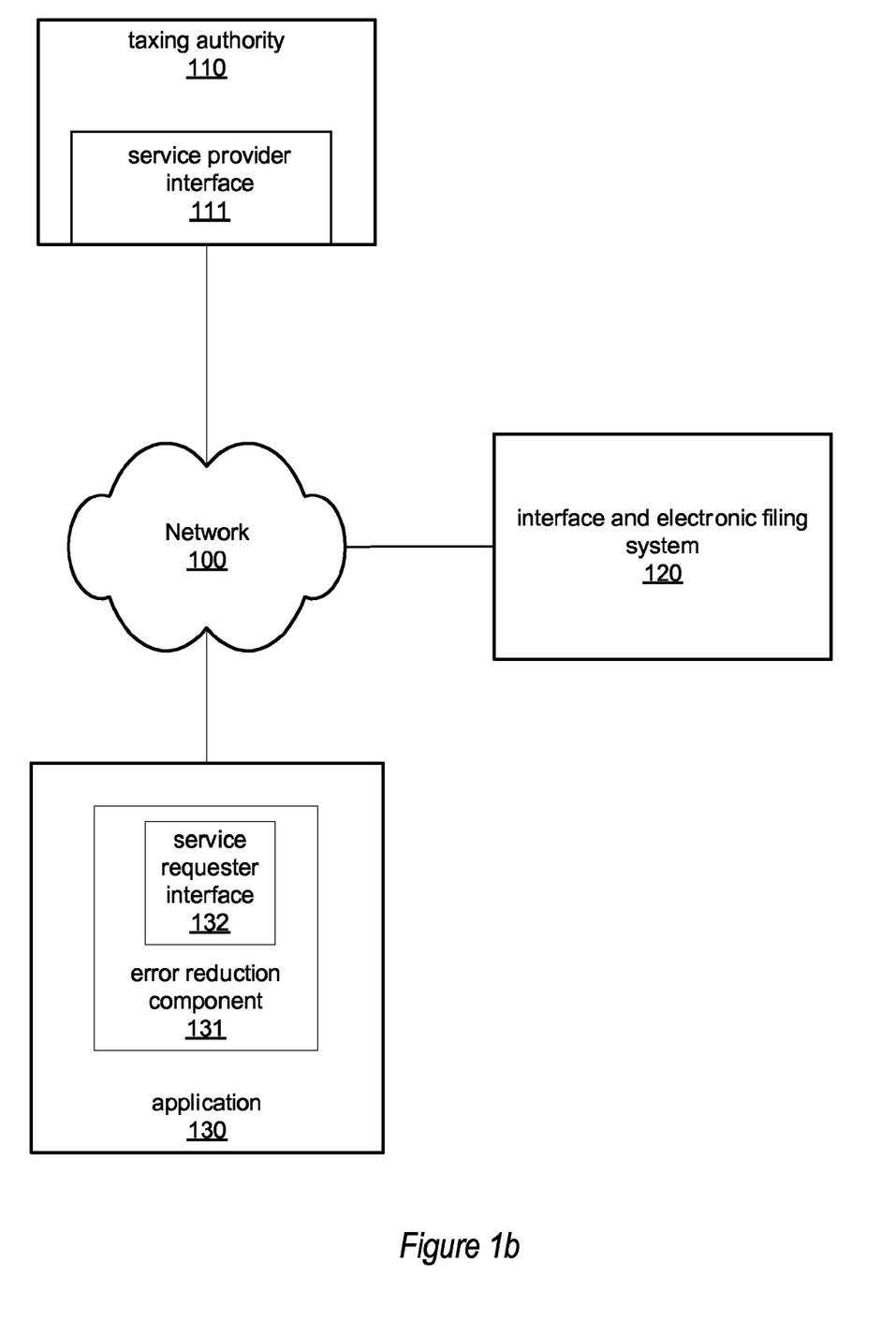
FIG. 1b is a block diagram illustrating one embodiment of a system for reducing return errors, as described herein.

FIG. 1b is a block diagram illustrating the system of FIG. 1 with the addition of an interface and electronic filing system. Interface and electronic filing system 120 may serve as an interface between application 130 (and error reduction component 131) and taxing authority 110. For example, in some cases taxing authority 110 may be configured to only communicate with systems that have been certified to communicate with the taxing authority. In some cases, application 130 may not be (or may not be running on) a system certified to communicate with the taxing authority. In this case, interface and electronic filing system may be a system certified to communicate with taxing authority 110 and may also enable application 130 (and error reduction component 131) to communicate with taxing authority 110 through interface and electronic filing system 120. In general, any communication between application 130 (and error reduction component 131) and taxing authority 110 may also be implemented through interface and electronic filing system 120. In some embodiments, interface and electronic filing system may serve as proxy for communication between taxing authority 110 and application 130.

In various embodiments, interface and electronic filing system 120 may include the functionality of an electronic filing server. In other words, interface and electronic filing system 120 may be configured to electronically file a tax return with taxing authority 110. Interface and electronic filing system 120 may receive an electronic tax return from a system (e.g., application 130) and electronically file the tax return with a taxing authority. In one embodiment, application 130 may be a tax preparation application that is configured to submit a tax return (e.g., a tax return created from user-supplied tax information) to interface and electronic filing system 120. In response, interface and electronic filing system 120 may electronically file the tax return with taxing authority 110.

Figure 2A:
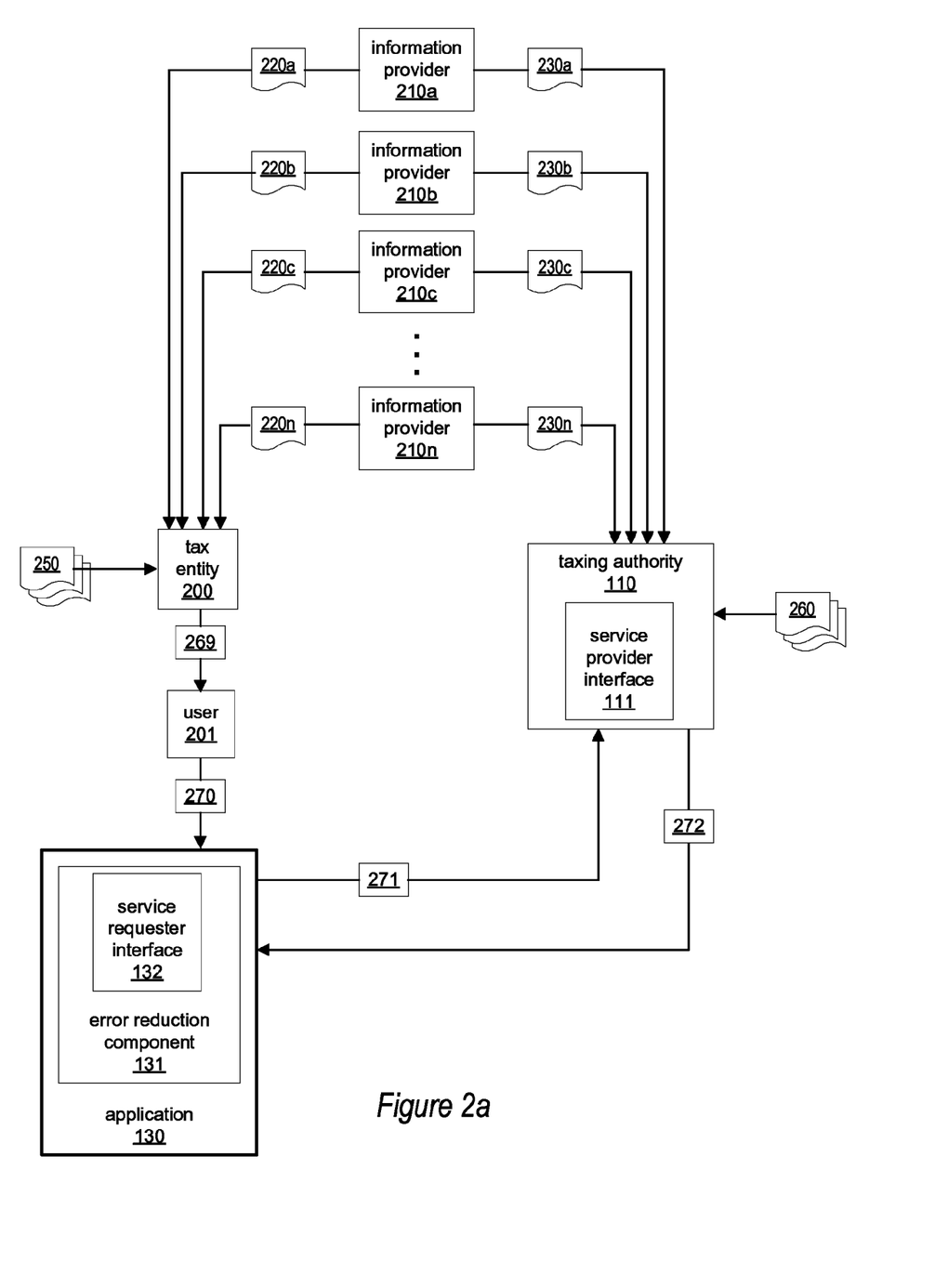
FIG. 2a is a data and information flow diagram illustrating one embodiment of a system for reducing return errors, as described herein.

FIG. 2a is a data and information flow diagram illustrating one embodiment of a system for reducing return errors. As illustrated by blocks 210, multiple information providers may send information to a tax entity and a taxing authority. The information providers may be any entity that reports tax related information including but not limited to employers, banks, financial institutions, investment firms, trusts, and partnerships. For example, information provider 210a may be an employer of entity 200. Information provider 210a, may send information 220a to entity 200 such as IRS Form W-2 containing, among other items typically found on a Form W-2, annual wages and federal taxes withheld. In further example, information provider 210b may be an investment firm in which entity 200 holds investments that earn interest. Information provider 210b may send information 220b, such as IRS Form 1099-INT, to entity 200.

Please note, while FIG. 2a illustrates a separate tax entity and application user, in some cases, user 201 and tax entity 200 may be the same entity (e.g. an individual). In other cases, user 201 may be a different entity, such as an entity that is acting on behalf of tax entity 200 (e.g., an accountant acting on behalf of a business). In this case the information that tax entity 200 receives from information provider 210 (as well as additional information 250, described below) may be provided to user 201 as shown by the transfer of information 269 from tax entity 200 to user 201.

Additionally, information providers 210 may provide corresponding tax entity information to taxing authority 110. For example, an employer may send information regarding wages of an employee (a tax entity) to a taxing authority. The information sent to taxing authority 110 may correspond to the information sent to tax entity 200. In some cases, the information sent to taxing authority 110 may be the same as the information sent to tax entity 200. For example, if information source 210a sends a Form W-2 to tax entity 200, the same form (or a copy of the form) may be sent to taxing authority 110 as tax information 230a. In other cases, tax information 230 may not be exactly the same as tax information 220. However, in general, tax information 230 contains at least some portion of information that corresponds to tax information 220. For example, if tax information 220a is an IRS Form W-2, tax information 230a may not necessarily be a Form W-2. Nevertheless, tax information 230a may contain tax information of the Form W-2 (e.g., wages or taxes withheld). The information sent from information providers 210 (e.g., tax information 220 and 230) may be of any form. For example, tax information 220 and/or 230 may be in electronic form such as a format accepted by a taxing authority or a format accepted by a user (e.g., email). In other cases, the information may be sent in hardcopy format (e.g., by mail).

Tax entity 200 and taxing authority 110 may have access to additional information such as additional information 250 and additional information 260. Additional information 250 may be any information pertaining to tax entity 200 or to tax related information associated with the tax entity. For example, additional information 250 may represent, among other things, a Social Security Card, Social Security Number, Employer Identification Number, contact information, information pertaining to dependents, tax exemptions, tax deductions, tax credits, or tax records. Additional information 260 may represent tax related information that taxing authority 110 may access. For example, additional information 260 may represent Social Security information such as a database that correlates Social Security Numbers to names of tax entities. Additional information 260 may be information that taxing authority 110 may use to verify information of tax returns. For example, the Social Security information described above may be used to verify social security numbers included in tax returns submitted to taxing authority 110.

As described above, in some cases, tax entity 200 and user 201 may be the same entity such as an individual. In other cases, user 201 may be an entity that is acting on behalf of tax entity 200, such as an accountant acting on behalf of a business. User 201 may submit tax information, such as a tax return or other tax information, to application 130 and error reduction component 131 as illustrated by user-supplied tax information 270. Tax information 270 may be an entire tax return, a portion of a tax return, or tax related information such as information that would typically be included in a tax return. User-supplied tax return information may be entered by the user (e.g., typing) or provided electronically, such as directing the error reduction component to a file located locally or externally (e.g., through a network). In general, the user may provide the user-supplied tax information to error reduction component 131 by any means in which error reduction component 131 is configured to accept.

Error reduction component 131 may detect errors within the user-supplied tax information. To detect errors within the tax information submitted by a user, error reduction component 131 may request (or query) taxing authority 110 for tax entity information pertaining to tax entity 200 as illustrated by request 271. Request 271 may include identifying information that identifies tax entity 200 such that taxing authority 110 will be able to retrieve information pertaining to the specific tax entity. For example, request 271 may include a Social Security Number of tax entity 200 or another piece of identifying information such as a driver's license number. In response, taxing authority 110 may transmit tax entity information 272 to error reduction component 131. As described above in regard to FIG. 1, taxing authority 110 may be provide a web service (or API) such that service provider interface may service service requests from other interfaces such as the service requester interface 132 of the error reduction component. Service requester interface may be utilized by error reduction component 131 to request and receive tax entity information from taxing authority 110.

Error reduction component 131 may detect errors within the user-supplied tax information 270 by comparing it to the corresponding tax entity information 272. For example, user-supplied tax information 270 may indicate that the user earned wages of $50,000 from a total of two income sources during a specific time period. Error reduction component 131 may determine any differences between the user-supplied tax information and the corresponding tax entity information by comparison. For instance, if the corresponding tax entity information indicates that the user earned wages of $51,000 during the same time period, error reduction component 131 may detect a difference between the two portions of information. In other words, error reduction component 131 may use tax entity information from taxing authority 110 to detect differences that it may not be able to detect otherwise.

Figure 2B:
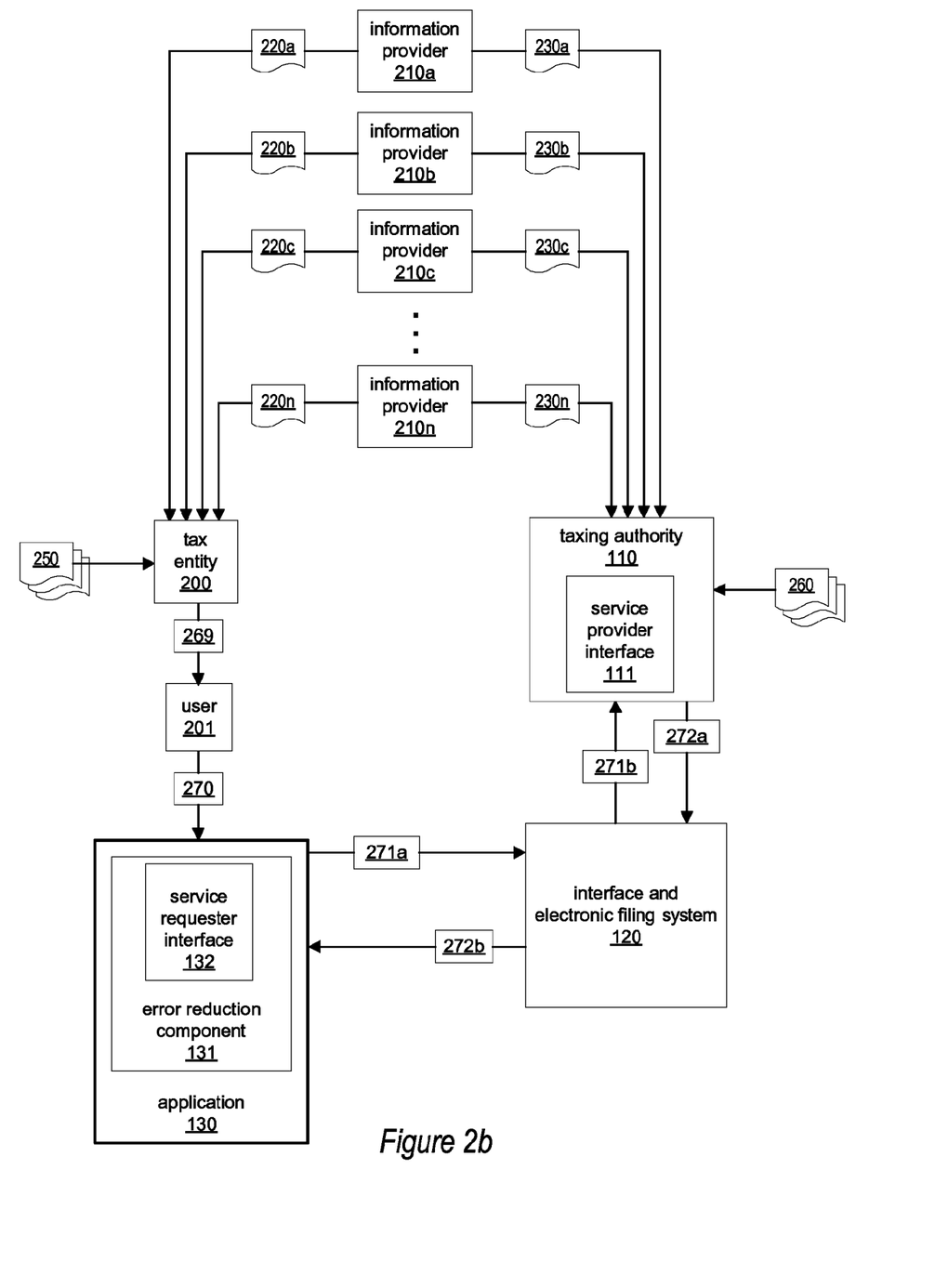
FIG. 2b is a data and information flow diagram illustrating one embodiment of a system for reducing return errors, as described herein.

In some embodiments, as shown in FIG. 2*b*, error reduction component 131 may send and receive information request 271*a* and tax entity information 272*b* through interface and electronic filing system 120 as described above. For example, if error reduction component 131 and taxing authority 110 are not configured to communicate directly, interface and electronic filing system 120 may serve as an intermediary between the two. In other words, interface and electronic filing system 120 may provide an interface such that error reduction component 131 and taxing authority 110 may communicate with one another. For example, information request 271*a* may be sent according to a format in which error reduction component 131 is configured to communicate while request 271 may be sent from the interface and electronic filing system according to a format in which taxing authority 110 is configured to receive.

In some embodiments, application 130 may be a tax preparation application. In other words, application 130 may be an application configured to create a tax return from user-supplied tax information and file the tax return with a taxing authority (in some cases, through an electronic filing system). In various embodiments, user 201 may provide tax information 270 to tax preparation application 130. Application 130 may operate as described above. In other words, application 130 may create an electronic tax return for a tax entity from the tax information provided by the user. Application 130 may receive tax information 270 from a user (e.g., information pertaining to wages, taxes withheld, tax credits, tax deductions) and create an electronic tax return from the information. Error reduction component 131 may detect errors within the electronic tax return created by application 130. To detect the errors, error reduction component 131 may send a request 271*a* (or query) to taxing authority 110 for tax entity information associated with the user. In response, taxing authority 110 may send the tax entity information to application 130 as illustrated by tax entity information 272*a*. Error reduction component 131 may utilize the tax entity information to check for errors within the tax return created by tax preparation application 130. Error reduction component 131 may utilize any of the error checking methods described above in regard to error reduction component 131. For example, error reduction component 131 may check for errors within the tax return such as errors associated with an incorrect Social Security Number or amount of income earned. In other words, error reduction component 131 enables tax preparation application 130 to detect errors within an electronic tax return before the tax return is filed with a taxing authority. Additionally, error reduction component may request tax entity information from a taxing authority at any point during the creation of tax return by application 130. For example, the corresponding tax entity information may be retrieved before, during or after the preparation of a tax return. Similarly, differences between the user-supplied tax information and the corresponding tax entity information may be determined at any point throughout the creation of a tax return. For example, a user creating a tax return with application 130 may desire to check for discrepancies in real time (e.g., during preparation of a return) or, alternatively, after the tax return has been created.

Figure 2C:
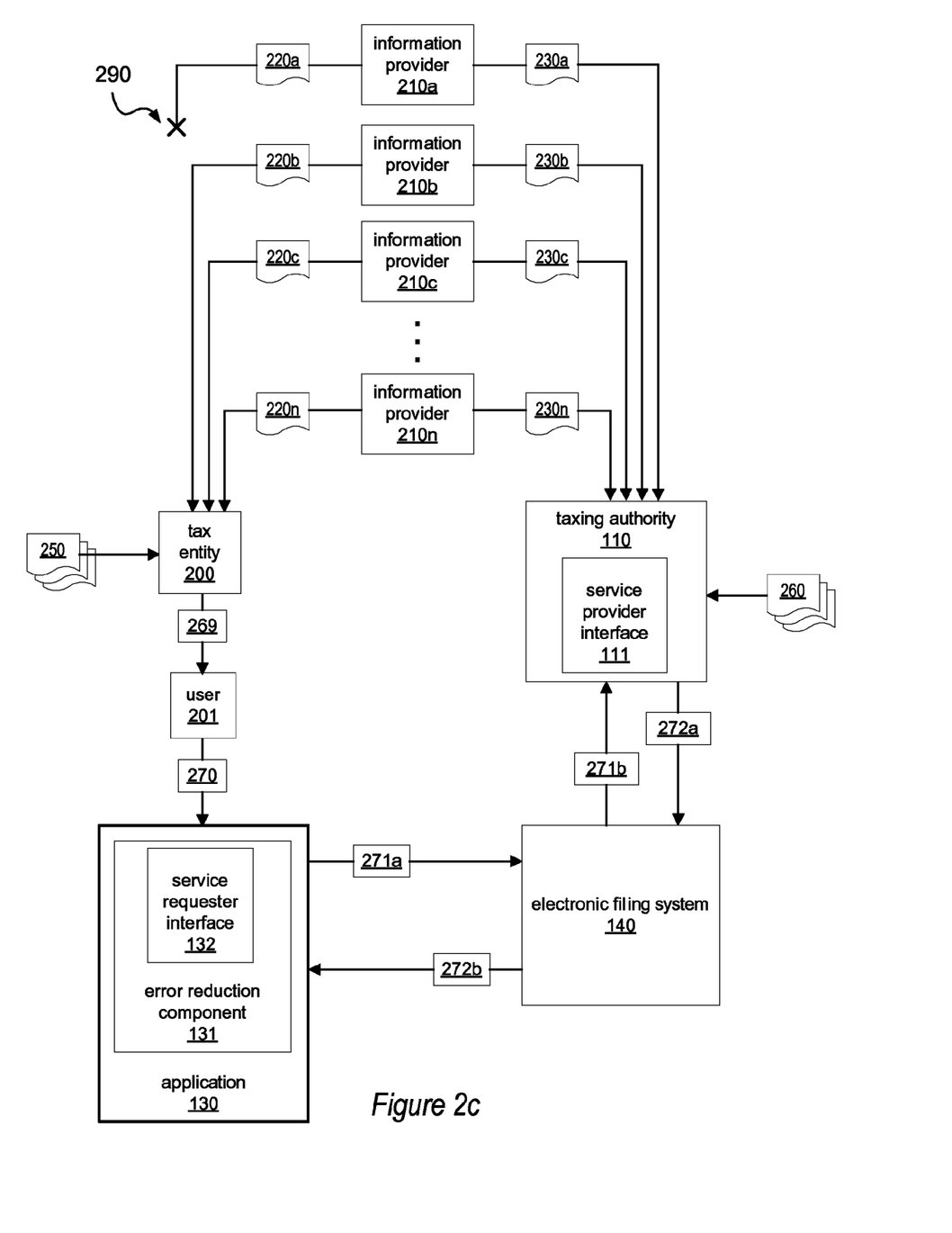
FIG. 2c is a data and information flow diagram illustrating one embodiment of a system for reducing return errors, as described herein.

FIG. 2*c* illustrates one example of a failure capable of causing an information discrepancy that may be detected by error reduction component 131. Transmission failure 290 may represent any failure that would reduce the transmission of tax information 220*a* from information provider 210*a* to tax entity 200. For example, if tax information 220*a* were to be transmitted by mail, transmission failure 290 may represent a failure of the mail system (e.g., lost or stolen mail). In further example, if information 220*a* were to be transmitted electronically, such as through electronic mail, transmission failure 290 may represent an electronic mail server failure.

For example, information 220*a* may represent a form 1099-INT indicating an interest income of $500. Further, tax entity 200 may fail to receive information 220*a* and thus may fail to provide this information to user 201 and application 130 (e.g., by failing to include the $500 interest income within tax information 269). After application 130 receives tax entity information 272*b*, error reduction component 131 may detect a discrepancy of $500 in income reported between the user-supplied tax information 270 and the tax entity information 272*b*. In other words, error reduction component 131 may detect an error that otherwise would not have been detected until after filing the tax return with the taxing authority. The user may correct the error(s) (e.g., by properly including the $500 interest income when creating a tax return with a tax preparation application such as application 130) and submit the tax return for filing with taxing authority 110.

Figure 3:
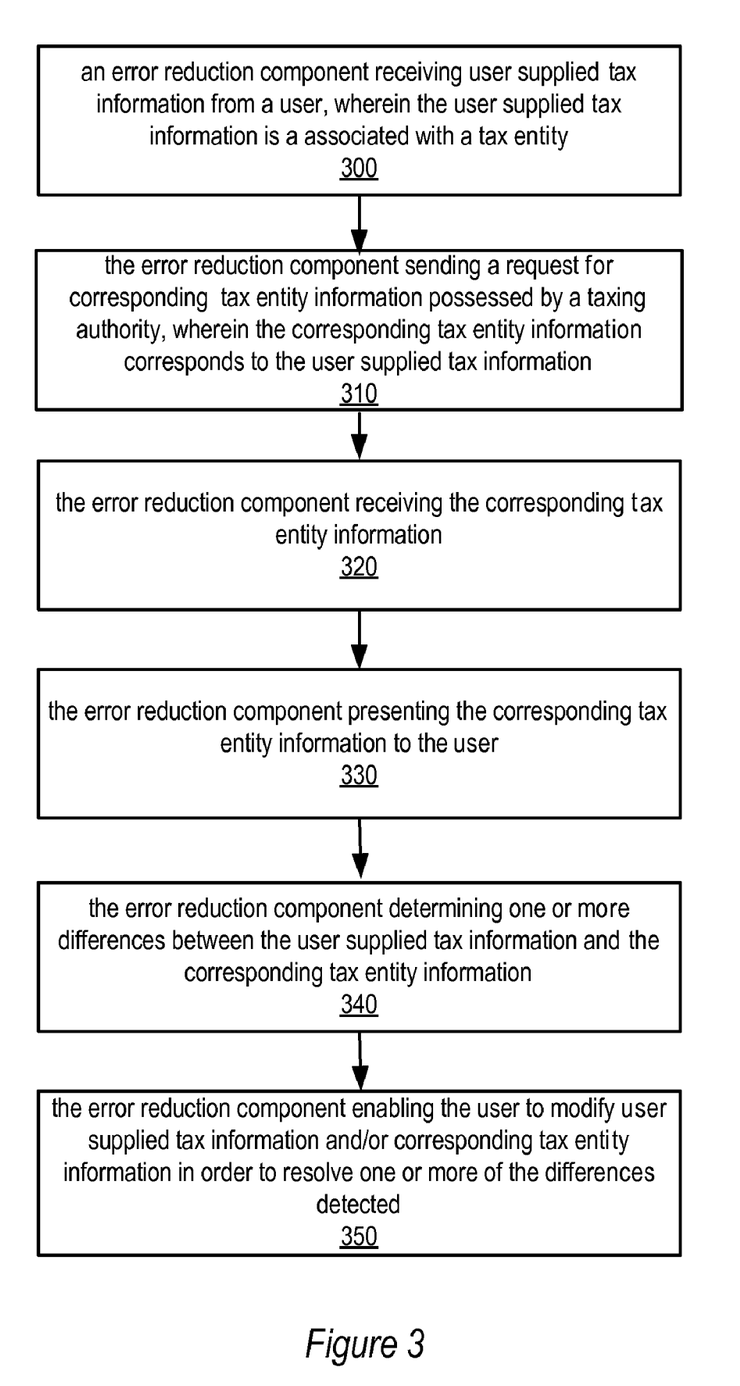
FIG. 3 is a flowchart illustrating one embodiment of a method for determining discrepancies among user-supplied tax information and corresponding tax entity information, as described herein.

FIG. 3*a* is a flowchart illustrating one embodiment of a method for determining discrepancies among user-supplied tax information and tax entity information, and, if necessary, correcting such discrepancies. Block 300 illustrates an error reduction component receiving user-supplied tax information that is associated with a tax entity. In one embodiment, receiving user-supplied tax information may include providing a user interface to a user (e.g., a series of displays that prompt a user for tax information) that enable a user to provide information to the error reduction component. In one embodiment, receiving user-supplied tax information may include receiving a storage location (e.g., a pathname) to data that includes user-supplied tax information. For example, a user may direct the error reduction component to a memory location on a computer or network. In another embodiment, error reduction component may be part of a tax preparation application and receiving the user-supplied tax information from a user may include receiving the information that is entered during the preparation of a tax return.

In order to check for discrepancies within user-supplied tax information (e.g., a tax return), it may be necessary to obtain corresponding tax entity information in which the user-supplied tax information may be compared. Block 310 illustrates the error reduction component sending a request for tax entity information associated with a specific tax entity. Sending a request for tax entity information may include sending a request to a taxing authority or other entity configured to provide tax entity information. For example, a taxing authority may accumulate tax entity information from entities that report tax related information for tax entities such as employers, banks, financial institutions, investment firms, trusts and partnerships. In some embodiments, sending a request may include querying a database of tax entity information. In one embodiment, the request may contain information that identifies a particular tax entity such as a Social Security Number, Employer Identification Number, driver's license number, name, or other form of information that identifies a particular tax entity. The request may be received by an entity (e.g., a taxing authority) that may send tax entity information in response to the request. Block 320 illustrates receiving the tax entity information. Receiving the corresponding tax entity information may include receiving the tax entity information directly from a taxing authority or through an intermediary such as an electronic filing system. After receiving the corresponding tax entity information and before a tax return is filed that contains the user-supplied tax information, the error reduction component may present to the user the corresponding tax entity information.

The tax entity information may be used to detect differences between user-supplied tax information (e.g., a tax return) and the corresponding tax entity information. Block 340 illustrates the error reduction component determining if a specific portion of the tax return information is different than a corresponding portion of user-supplied tax information. For example, portions of the user-supplied tax information and the tax entity information that correspond to a user's income may be compared to determine if they are different or the same. For instance, the user-supplied tax information may indicate that the user earned $50,000 in annual wages from a single income source. Additionally, the tax entity information may indicate that the user earned $51,000 in annual wages from multiple income sources. Since the user-supplied tax information differs from the tax entity information, a difference or discrepancy may be determined. In further example, the user-supplied tax information may indicate that the Social Security Number of the user is 223-00-4567. Additionally, the tax entity information may indicate that the Social Security Number of the user is 123-00-4567. Since the Social Security Numbers do not match, a difference may be determined. Determining a difference between a portion of user-supplied tax information and tax entity information may include determining differences among any type of tax related information, including but not limited to, income (e.g., wages, interest, capital gains), taxes withheld, tax deductions, and/or tax credits.

Block 350 illustrates the error reduction application enabling the user to correct an error of the user-supplied tax information or of the corresponding tax entity information. Enabling the user to correct an error of the user-supplied tax information or the tax entity information may include providing the user with a user-interface or display in which the user may enter and submit the correct information for inclusion within an updated set of user-supplied tax information (e.g., a tax return). In one embodiment, enabling the user to correct an error of the corresponding tax entity information may include sending a correction to an entity (e.g., a taxing authority). For example, if a user has recently changed names (e.g., as a result of marriage), a taxing authority may have the user's previous name on record. In this case, correcting the tax entity information may include sending the taxing authority the user's current name. In one embodiment, a taxing authority may provide a web service (or API) for receiving correction requests. In this case, correcting corresponding user-supplied tax information may include sending a web service request according to the web service or API of the taxing authority.

Figure 4:
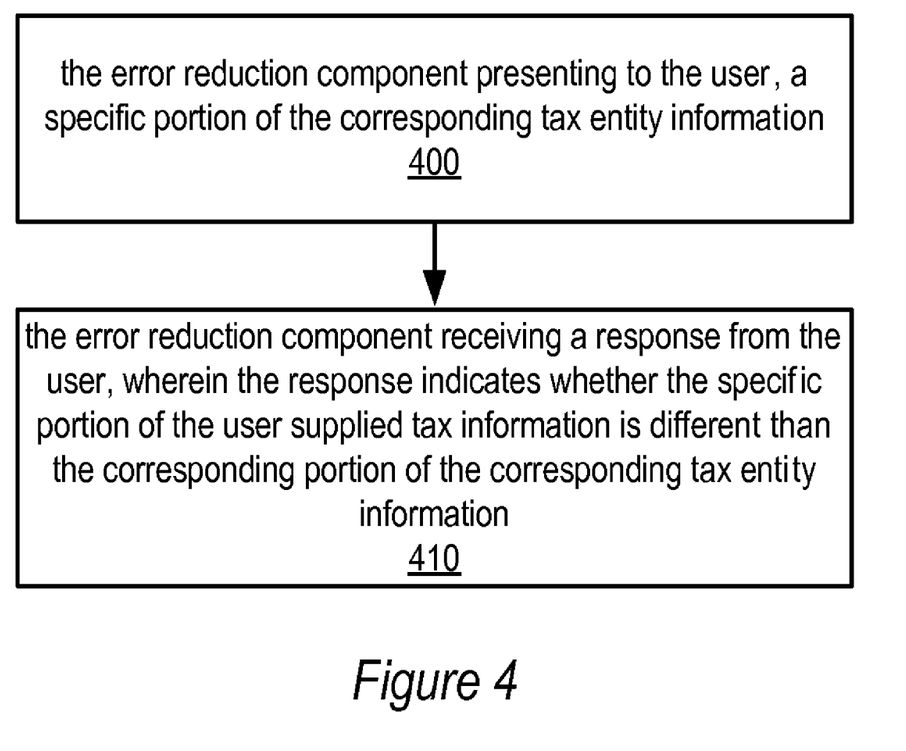
FIG. 4 is a flowchart illustrating one embodiment of a method for determining if a specific portion of the tax entity information is different than a corresponding portion of user-supplied tax information, as described herein.

FIG. 4 is a flowchart illustrating one embodiment of a method for the error reduction component to determine if a specific portion of the user-supplied tax information is different than a corresponding portion of tax entity information from a taxing authority. Block 400 illustrates the error reduction application providing the tax entity information to the user. In general, any method of presenting the specific portion of tax entity information to the user may be acceptable. For example, providing the tax entity information to the user may include presenting the information to the user through a display of an error reduction component or application. The user may compare the tax entity information to the information submitted by the user and proved a response that indicates whether the information differs. For example, if the tax entity information indicates the user earned $51,000 in income and the user-supplied tax information indicates an income of $50,000, the user may indicate in a response that the information does not match. Block 410 illustrates receiving a response from the user such as through a user interface. The response may indicate whether the specific portion of the tax entity information is different than the corresponding portion of the user-supplied tax information.

Figure 5A:
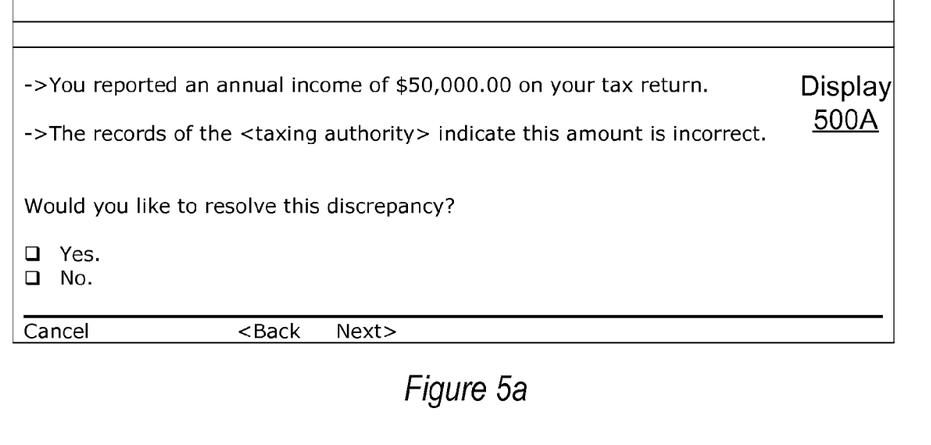
FIG. 5a illustrates one embodiment of a display for notifying a user of errors or discrepancies, as described herein.
Figure 5B:
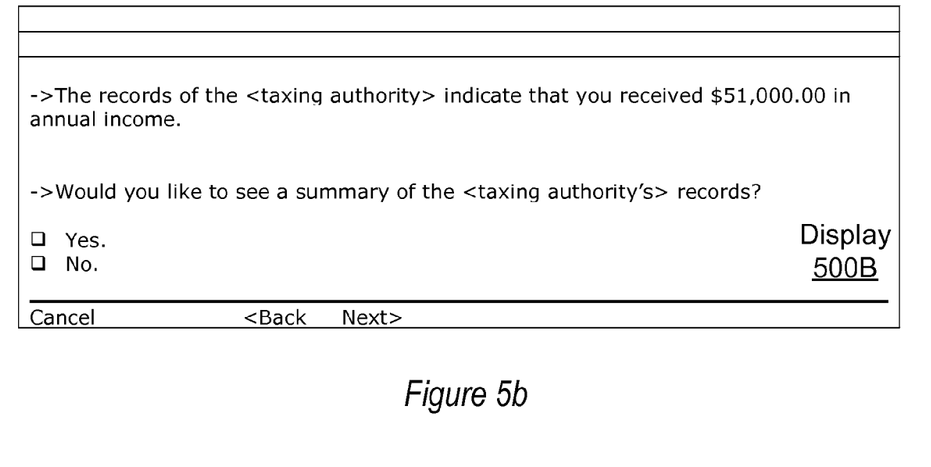
FIG. 5b illustrates one embodiment of a display for notifying a user of errors or discrepancies, as described herein.
Figures 5C, 5D:
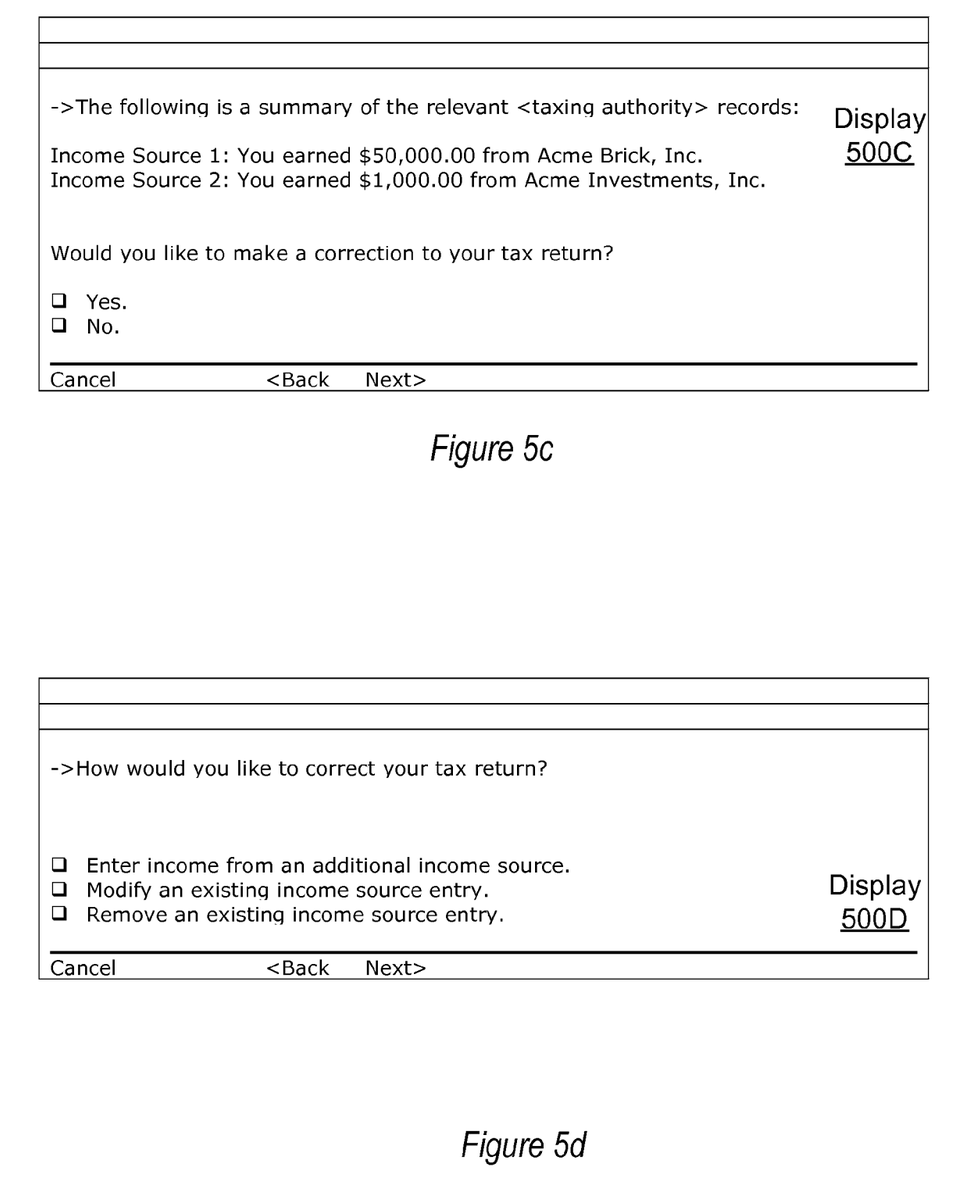
FIG. 5c illustrates one embodiment of a display for notifying a user of errors or discrepancies, as described herein.
FIG. 5d illustrates one embodiment of a display for correcting errors or discrepancies, as described herein.

FIG. 5 illustrates one example of a series of displays that may notify a user of a discrepancy between user-supplied tax information and tax entity information from a taxing authority. In this particular example, the user of the application is also the tax entity. For example, if a tax entity's income for a specific time period included in a tax return does not match the corresponding tax entity information received from a taxing authority, the user may be presented with a display such as Display 500*a* that informs the user of the discrepancy. As illustrated by Display 500*a*, the user may be informed of the specific portion of tax information that is in question (income). The user may be given an option to resolve the discrepancy. Display 500*b* may inform the user of the specific tax entity information (e.g., the income records of the taxing authority associated with the tax entity) and enables the user to view additional details about the tax entity information. Display 500*c* provides a user with further details about the tax entity information. For example, the user may be presented with a list of income sources that have reported paying the tax entity income in addition to the amounts earned from each. Display 500*d* may provide the user with various options for correcting a discrepancy. In this example, the user may choose to enter income from an additional source and report income source 2 as shown in display 500*c*.

Various embodiments of a system and method for reducing return errors, as described herein, may be executed on one or more computer systems, which may interact with various other devices. One such computer system is computer system 600 illustrated by FIG. 6. Computer system 600 may be capable of implementing the various systems and applications described above including the elements of FIGS. 1 and 2 (e.g., computer system 600 may be configured to run application 130 or implement an interface and electronic filing system or a taxing authority as described). In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 660, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

Figure 6:
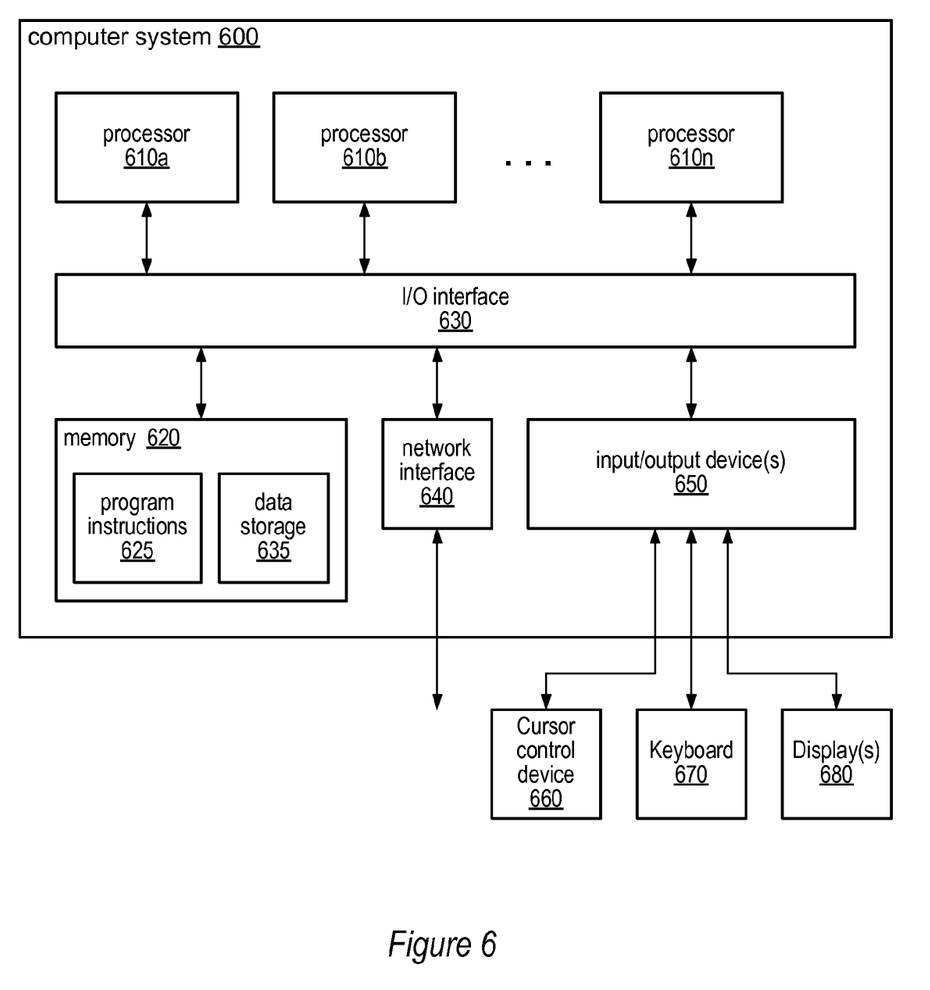
FIG. 6 illustrates a computing system capable of implementing various systems, according to one embodiment, as described herein.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 100), such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, configured to implement embodiments of a system and method for reducing return errors as described herein (e.g., application 130 and or error reduction component 131), and data storage 635, comprising various data (e.g., documents, tables, databases) accessible by program instructions 625. In one embodiment, program instructions 625 may include one or more elements illustrated in FIGS. 1-5 and data storage 636 may include the data illustrated in FIG. 2 (e.g., user-supplied tax information and tax entity information). In other embodiments, different elements and data may be included.

Those skilled in the art will appreciate that computer system 600 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising: a processor; and
a memory coupled to the processor, wherein the memory comprises program instructions for executing:
an error reduction component of a tax preparation software application, the error reduction component configured to: receive user-supplied financial information for a tax return to be filed with a tax authority for an entity;
send a request to the tax authority for entity tax information associated with the entity, wherein the entity tax information is obtained from the tax authority and associated with a particular tax year;
in response to the request, receive the entity tax information from the tax authority;
prior to filing the tax return on behalf of the entity to the tax authority:
determine one or more differences between a portion of the user-supplied financial information and a corresponding portion of the entity tax information received from the tax authority;
and send a correction request in a certified communication to the tax authority to correct at least one of the one or more differences between the portion of the user-supplied financial information and the corresponding portion of the entity tax information received from the tax authority, wherein the communication has been certified by the tax authority as received from the tax preparation software application.

2. The system of claim 1, wherein the error reduction component is further configured to:
provide to a user an interface for modifying the user-supplied information in order to reconcile the one or more differences.

3. The system of claim 1, wherein determining the one or more differences comprises:
presenting to a user a portion of the entity tax information; and
receiving a response from the user, wherein the response indicates that the portion of the entity tax information is different than a corresponding portion of user-supplied financial information.

4. The system of claim 1, wherein said entity tax information is associated with a particular tax entity.

5. The system of claim 1, wherein said user-supplied financial information is tax information associated with a user.

6. A computer-implemented method executable by a processor, the method comprising:
receiving user-supplied financial information for a tax return to be filed with a tax authority for an entity, sending a request to the tax authority for entity tax information associated with the entity for a particular tax year, wherein the entity tax information is obtained from the tax authority; in response to the request, receiving the entity tax information from the tax authority; and prior to filing the tax return on behalf of the entity to the tax authority:
determining one or more differences between a portion of the user-supplied financial information and a corresponding portion of the entity tax information received from the tax authority; and
sending a correction request in a certified first communication to the tax authority to correct at least one of the one or more differences between the portion of the user-supplied financial information and the corresponding portion of the entity tax information received from the tax authority, wherein the first communication has been certified by the tax authority as received by the tax authority.

7. The computer-implemented method of claim 6, further comprising:
providing to a user an interface for modifying the user-supplied financial information in order to reconcile the one or more differences.

8. The computer-implemented method of claim 6, wherein said determining comprises:
presenting to a user a portion of the entity tax information; and
receiving a response from the user, wherein the response indicates whether the portion of the entity tax information is different than a corresponding portion of user-supplied financial information.

9. The computer-implemented method of claim 6, wherein said entity tax information is associated with a particular tax entity.

10. The computer-implemented method of claim 6, wherein said user-supplied financial information is tax information associated with a user.

11. A computer-readable storage medium, comprising program instructions computer-executable to implement:
receiving user-supplied financial information for a return to be filed with a tax authority for an entity;
sending a request for entity tax information associated with the entity, wherein the entity tax information is obtained from the tax authority and associated with a particular time period; in response to the request, receiving the entity tax information; and prior to filing the tax return to the tax authority for the entity:

determining one or more differences between a portion of the user-supplied financial information and a corresponding portion of the entity tax information; and sending a correction request in a certified communication to the tax authority to correct at least one of the one or more differences between the portion of the user-supplied financial information and the corresponding portion of the entity tax information received from the tax authority, wherein the communication has been certified by the tax authority as received by the tax authority.

12. The computer-readable storage medium of claim 11, wherein the program instructions are further executable to implement:

providing to a user an interface for modifying the user-supplied financial information in order to reconcile the one or more differences.

13. The computer-readable storage medium of claim 11, wherein said determining comprises:

presenting to a user a portion of the entity tax information; and receiving a response from the user, wherein the response indicates that the portion of the entity tax information is different than a corresponding portion of user-supplied financial information.

14. The computer-readable storage medium of claim 11, wherein said entity tax information is associated with a particular tax entity.

15. The computer-readable storage medium of claim 11, wherein said user-supplied financial information is tax information associated with a user.

16. The computer-readable storage medium of claim 11, wherein the program instructions are further executable to implement a tax preparation application.

17. The computer-implemented method of claim 6, further comprising:

notifying a user of the one or more differences; requesting input from the user to resolve the one or more differences; and receiving the input from the user.

18. The computer-implemented method of claim 17, further comprising:

generating revised entity tax information using the input from the user to resolve the one or more differences.

19. The computer-implemented method of claim 18, further comprising:

sending the revised entity tax information in a certified second communication to the tax authority.

20. The computer-implemented method of claim 17, further comprising:

updating the user-supplied financial information using the input from the user to resolve the one or more differences.

21. The computer-implemented method of claim 17, further comprising: notifying the tax authority of the one or more differences.

\* \* \* \* \*